United States Patent
Zhou et al.

(10) Patent No.: US 12,406,444 B2
(45) Date of Patent: Sep. 2, 2025

(54) REAL-TIME FASHION ITEM TRANSFER SYSTEM

(71) Applicant: Snap Inc., Santa Monica, CA (US)

(72) Inventors: Kai Zhou, Wiener Neudorf (AT); Laura Rosalia Luidolt, Vienna (AT); Himmy Tam, London (GB); Riza Alp Guler, London (GB); Iason Kokkinos, London (GB); Avihay Assouline, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 243 days.

(21) Appl. No.: 18/135,599

(22) Filed: Apr. 17, 2023

(65) Prior Publication Data

US 2024/0290043 A1  Aug. 29, 2024

(30) Foreign Application Priority Data

Feb. 23, 2023 (GR) .............................. 20230100156

(51) Int. Cl.
  *G06T 19/00* (2011.01)
  *G06T 13/40* (2011.01)
(52) U.S. Cl.
  CPC ............ *G06T 19/006* (2013.01); *G06T 13/40* (2013.01); *G06T 2210/16* (2013.01)
(58) Field of Classification Search
  None
  See application file for complete search history.

(56) References Cited

U.S. PATENT DOCUMENTS

| | | | |
|---|---|---|---|
| 2005/0154487 A1* | 7/2005 | Wang | A41H 3/007 33/15 |
| 2014/0126769 A1* | 5/2014 | Reitmayr | G06T 7/12 382/103 |
| 2014/0270357 A1 | 9/2014 | Hampiholi et al. | |
| 2015/0279098 A1 | 10/2015 | Kim et al. | |

(Continued)

FOREIGN PATENT DOCUMENTS

| | | |
|---|---|---|
| KR | 102381566 | 3/2022 |
| KR | 20220053739 | 5/2022 |

(Continued)

OTHER PUBLICATIONS

Twigg et al., "Body Scanning for Avatar Production and Animation", 2014. (Year: 2014).*

(Continued)

*Primary Examiner* — Nicholas R Wilson
(74) *Attorney, Agent, or Firm* — Schwegman Lundberg & Woessner, P.A.

(57) ABSTRACT

Methods and systems are disclosed for transferring garments from a real-world object to a virtual object. The system receives, by a client device, an image that includes a depiction of a real-world object having a fashion item in a real-world environment. The system accesses a three-dimensional (3D) avatar model of a human and generates a graphic item corresponding to the fashion item being worn by the real-world object depicted in the image. The system modifies the 3D avatar model of the human based on the graphic item and presents the 3D avatar model that has been modified based on the graphic item within a view of the real-world environment on the client device.

20 Claims, 12 Drawing Sheets

(56) References Cited

U.S. PATENT DOCUMENTS

| | | | |
|---|---|---|---|
| 2019/0371080 | A1 | 12/2019 | Sminchisescu et al. |
| 2021/0133919 | A1 | 5/2021 | Ayush et al. |
| 2021/0275925 | A1 | 9/2021 | Kolen et al. |
| 2024/0161242 | A1 | 5/2024 | Assouline et al. |

FOREIGN PATENT DOCUMENTS

| | | |
|---|---|---|
| KR | 20230007255 | 1/2023 |
| WO | 2024107634 | 5/2024 |
| WO | 2024177859 | 8/2024 |

OTHER PUBLICATIONS

Yuan et al., "A Mixed Reality Virtual Clothes Try-On System", 2013. (Year: 2013).*

"International Application Serial No. PCT US2023 079493, International Search Report mailed Mar. 25, 2024", 4 pgs.

"International Application Serial No. PCT US2023 079493, Written Opinion mailed Mar. 25, 2024", 7 pgs.

Cao, Z., "Realtime Multi-Person 2D Pose Estimation using Part Affinity Fields", Proceedings of the IEEE Conference on Computer Vision and Pattern Recognition, (2017), 9 pgs.

Roy, Debapriya, "LGVTON: a landmark guided approach for model to person virtual try-on", Multimedia Tools and Applications, Kluwer Academic Publishers, Boston, US, vol. 81, No. 4, (Jan. 8, 2022), 37 pgs.

"U.S. Appl. No. 18/068,383, Response filed Sep. 14, 2024 to Non Final Office Action mailed Jul. 19, 2024", 9 pgs.

"U.S. Appl. No. 18/068,383, Examiner Interview Summary mailed Sep. 17, 2024", 2 pgs.

"U.S. Appl. No. 18/068,383, Final Office Action mailed Oct. 1, 2024", 45 pgs.

"U.S. Appl. No. 18/068,383, Examiner Interview Summary mailed Nov. 18, 2024", 2 pgs.

"U.S. Appl. No. 18/068,383, Response filed Nov. 20, 2024 to Final Office Action mailed Oct. 1, 2024", 11 pgs.

"U.S. Appl. No. 18/068,383, Advisory Action mailed Dec. 3, 2024", 3 pgs.

"International Application Serial No. PCT US2024 015779, International Search Report mailed Jun. 18, 2024", 4 pgs.

"International Application Serial No. PCT US2024 015779, Written Opinion mailed Jun. 18, 2024", 4 pgs.

"U.S. Appl. No. 18/068,383, Non Final Office Action mailed Jul. 19, 2024", 36 pgs.

U.S. Appl. No. 18/068,383, filed Dec. 19, 2022, Real-Time Try-on Using Body Landmarks.

"U.S. Appl. No. 18/068,383, Notice of Allowance mailed Feb. 12, 2025", 10 pgs.

Su, Zhaoqi, et al., "MulayCap: Multi-layer Human Performance Capture Using A Monocular Video Camera", arXiv:2004.05815v3 [cs.CV], (Oct. 1, 2020), 18 pgs.

* cited by examiner

REAL-TIME FASHION ITEM TRANSFER SYSTEM

CLAIM OF PRIORITY

This application claims the benefit of priority to Greece patent Application Serial No. 20230100156, filed on Feb. 23, 2023, which is incorporated herein by reference in its entirety.

TECHNICAL FIELD

The present disclosure relates generally to providing augmented reality (AR) experiences using an interaction application.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
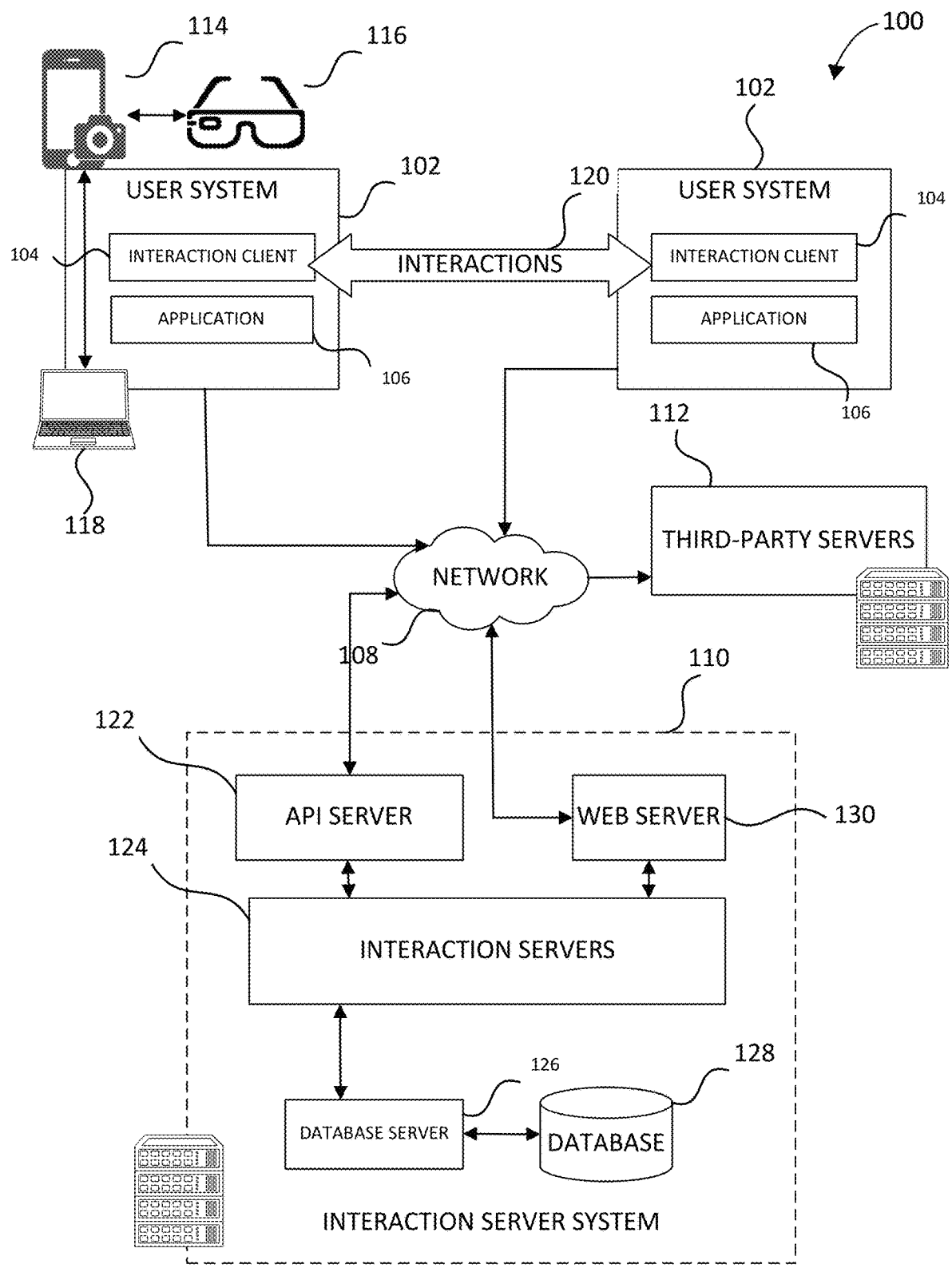
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given user by capturing an image of the user and, in addition, obtaining a depth map using a depth sensor of the real-world human body depicted in the image. By processing the depth map and the image together, the VR and AR systems can detect positioning of the user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive and more difficult to implement in a mobile device setting.

Certain systems do away with the need to use depth sensors to modify images. For example, certain systems allow users to replace a background in a videoconference in which a face of the user is detected. Specifically, such systems can use specialized techniques that are optimized for recognizing a face of a user to identify the background in the images that depict the user's face. These systems can then replace only those pixels that depict the background so that the real-world background is replaced with an alternate background in the images. However, such systems are generally incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions as belonging to the background rather than the foreground of the images. Also, such systems fail to properly replace the background when more than one user is depicted in the image or video feed. Because such systems are generally incapable of distinguishing a whole body of a user in an image from a background, these systems are also unable to apply visual effects to certain portions of a user's body, such as articles of clothing, garments, or fashion accessories and fashion items (e.g., jewelry, handbags, clothing, purses, and so forth).

Some AR systems allow AR graphics to be added to an image or video to provide engaging AR experiences. Such systems can receive the AR graphics from a designer and can scale and position the AR graphics within the image or video. In order to improve the placement and positioning of the AR graphics on a person depicted in the image or video, such systems detect a person depicted in the image or video and generate a rig representing bones of the person. This rig is then used to adjust the AR graphics based on changes in movement to the rig. While such approaches generally work well, the need for generating a rig of a person in real time to adjust AR graphics placement increases processing complexities and power and memory requirements. This makes such systems inefficient or incapable of running on small-scale mobile devices without sacrificing computing resources or processing speed. Also, the rig only represents movement of skeletal or bone structures of a person in the image or video and does not take into account any sort of external physical properties of the person, such as density, weight, skin attributes, and so forth. As such, any AR graphics in these systems can be adjusted in scale and positioning but cannot be deformed based on other physical properties of the person. In addition, an AR graphics designer typically needs to create a compatible rig for their AR graphic or AR fashion item.

The disclosed techniques seek to improve the efficiency of using the electronic device by using machine learning models (e.g., neural networks) to extract a fashion item worn by a real-world object (e.g., person or mannequin) depicted in an image and apply the extracted fashion item as an AR item to a 3D avatar model of a human. By using a machine learning model to extract the fashion item from a two-dimensional (2D) image and apply such a fashion item to a 3D model, the disclosed techniques can generate one or more AR visual effects to the image or video in real time in a more realistic and efficient manner and without the need for generating a rig or bone structures of the depicted real-world object.

In some examples, the disclosed techniques receive, by a client device (e.g., AR glasses and/or a mobile phone or other mobile device), an image that includes a depiction of a real-world object wearing a fashion item in a real-world environment. The disclosed techniques access a 3D avatar model of a human and generate an AR item corresponding to the fashion item being worn by the real-world object depicted in the image. The disclosed techniques modify the 3D avatar model of the human based on the AR item and present the 3D avatar model that has been modified based on the AR item within a view of the real-world environment on the client device.

This simplifies the process of adding AR graphics to an image or video which significantly reduces design constraints and costs in generating such AR graphics and decreases the amount of processing complexities and power and memory requirements. This also improves the illusion of the AR graphics being part of a real-world environment depicted in an image or video that depicts real-world objects. This enables seamless and efficient addition of AR graphics to an underlying image or video in real time on small-scale mobile devices. The disclosed techniques can be applied exclusively or mostly on a mobile device without the need for the mobile device to send images/videos to a server. In other examples, the disclosed techniques are applied exclusively or mostly on a remote server or can be divided between a mobile device and a server.

This improves the overall experience of the user in using the electronic device. Also, by providing such AR experiences without using a depth sensor, the overall amount of system resources needed to accomplish a task is reduced. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logos, AR emblems, pants, shorts, jackets, t-shirts, blouses, glasses, jewelry, earrings, bunny ears, a hat, earmuffs, or any other suitable item or object.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112.

Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

In some examples, the interaction client 104 enables a user to launch an AR experience in which a user of the interaction client 104 can request that a 3D avatar model (of the user or another person) is modified to be depicted as wearing one or more fashion items worn by a person or mannequin (or other real-world object) depicted in an image or video. In some examples, the interaction client 104 implemented on a user system 102 can be used to capture an image or video of a real-world object wearing a fashion item. The interaction client 104 implemented on the user system 102 of the first person can be used to select a 3D avatar model from many different 3D avatar models and/or generate a 3D avatar model based on user inputs and/or a body scan. The body landmarks of the 3D avatar model and real-world object can be extracted from the captured/obtained/received images, such as using one or more machine learning models, and a deviation or difference can be computed between the body landmarks to generate fit information for the fashion item. The interaction client 104 can apply the one or more machine learning models, such as a generative adversarial network (GAN) or other artificial neural network (ANN) to the fashion item, the fit information, and the 3D avatar model, to render a new image or video that depicts the 3D avatar model wearing the fashion item worn by the real-world object. The 3D avatar model can be animated in the video as dancing and rotating 360 degrees to allow a full view of the fashion item. The 3D avatar model can be shared with one or more other users.

In this way, a user can view how the 3D avatar model looks wearing a real-world fashion item of a real-world object depicted in an image or video in real time. Article of clothing, garment, or fashion item can include a shirt, skirt, dress, shoes, purse, furniture item, household item, eyewear, eyeglasses, AR logos, AR emblems, pants, shorts, jackets, t-shirts, blouses, glasses, jewelry, earrings, bunny ears, a hat, earmuffs, or any other suitable item or object. Further details of this AR experience are discussed below in connection with the fashion item transfer system 500 of FIG. 5.

System Architecture

Figure 2:
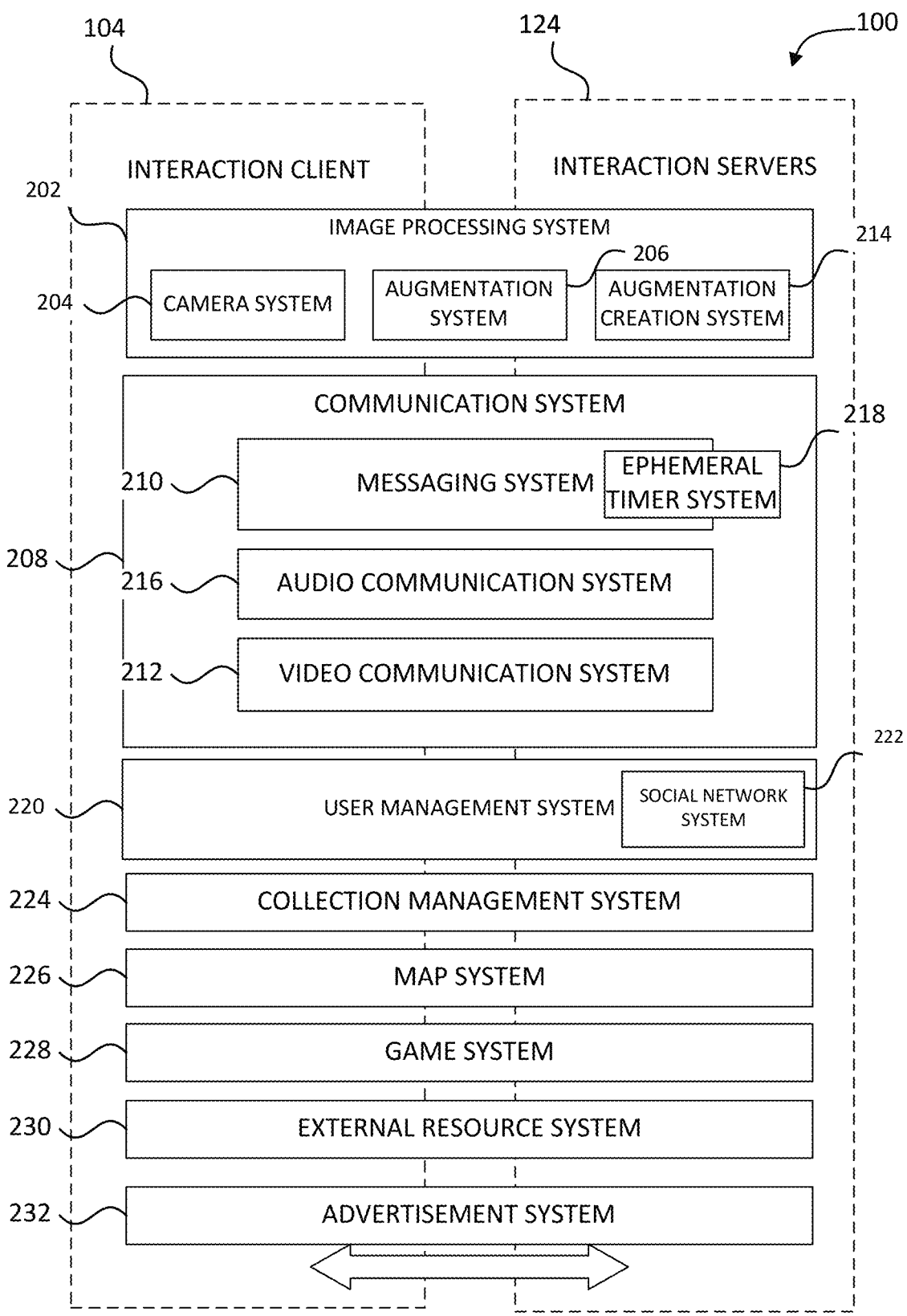
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include a fashion item transfer system 500 that enables a user to launch an AR experience in which a 3D avatar model selected by the user of the user system 102 is depicted as wearing a fashion item worn by a real-world object depicted in an image or video. An illustrative implementation of the fashion item transfer system 500 is shown and described in connection with FIG. 5 below.

Specifically, the fashion item transfer system 500 is a component that can be accessed by an AR/VR application implemented on the user system 102. The AR/VR application uses an RGB camera to capture a monocular image of a real-world object. The AR/VR application applies various trained machine learning techniques or machine learning models on the captured image of the real-world object to generate body landmark features representing the real-world object depicted in the images or videos and to apply one or more AR visual effects to the captured image or video based on body landmark features. In some implementations, the AR/VR application continuously captures images of the user and updates the body landmark features in real time or periodically to continuously or periodically update the applied one or more visual effects. This allows the user to move around in the real world and see the one or more visual effects update in real time.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1102 (shown in FIG. 11) of a user system 102. These augmentations are selected by the augmentation system 206 and presented to a user of an interaction client 104, based on a number of inputs and data, such as for example:

Geolocation of the user system 102; and
Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., to delete inappropriate content or redundant messages).

Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

Data Architecture

Figure 3:
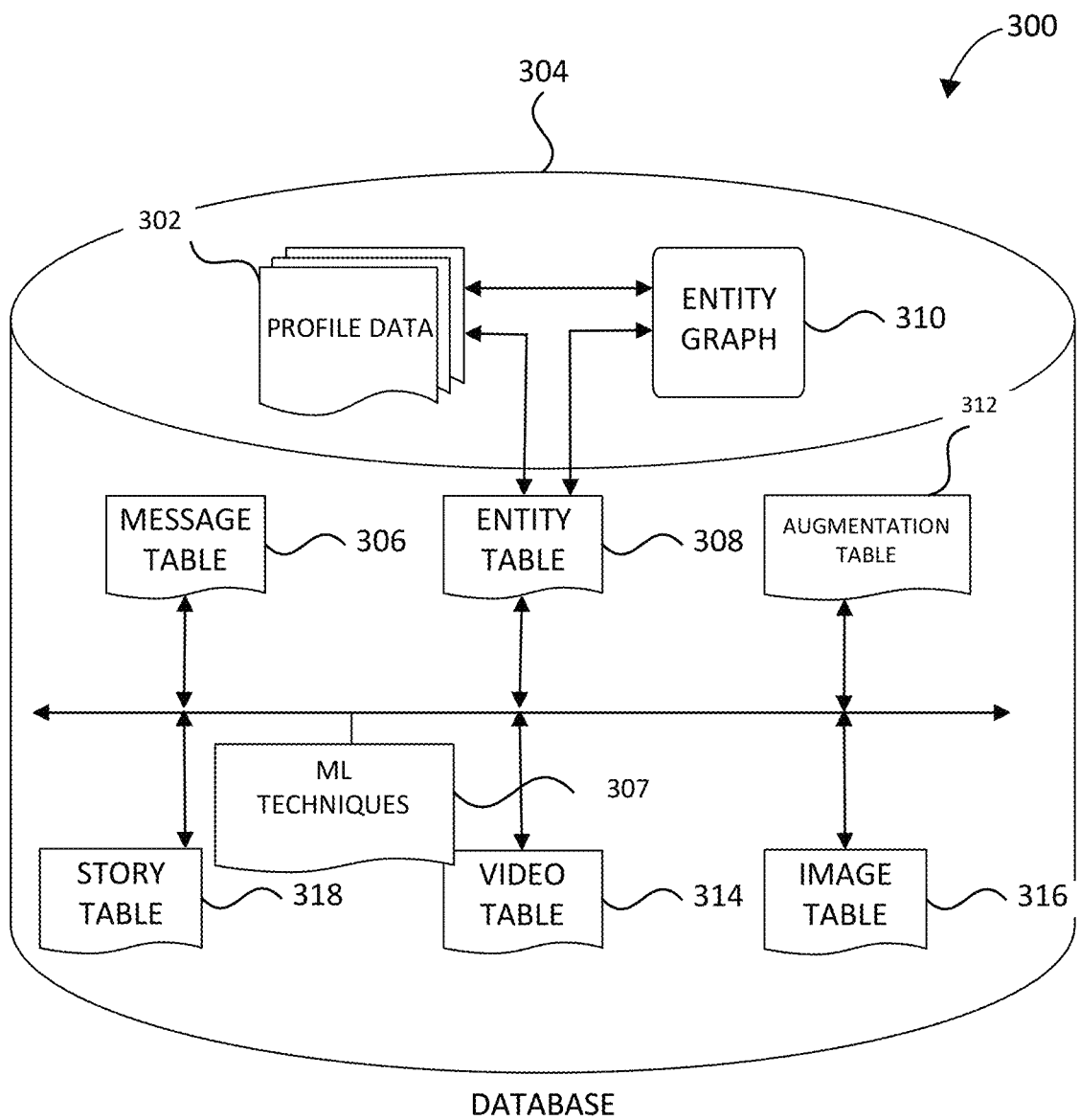
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning (ML) technique(s) 307 that stores parameters of one or more machine learning models that have been trained during training of the fashion item transfer system 500. For example, trained machine learning techniques 307 stores the trained parameters of one or more artificial neural network machine learning models or techniques.

Data Communications Architecture

Figure 4:
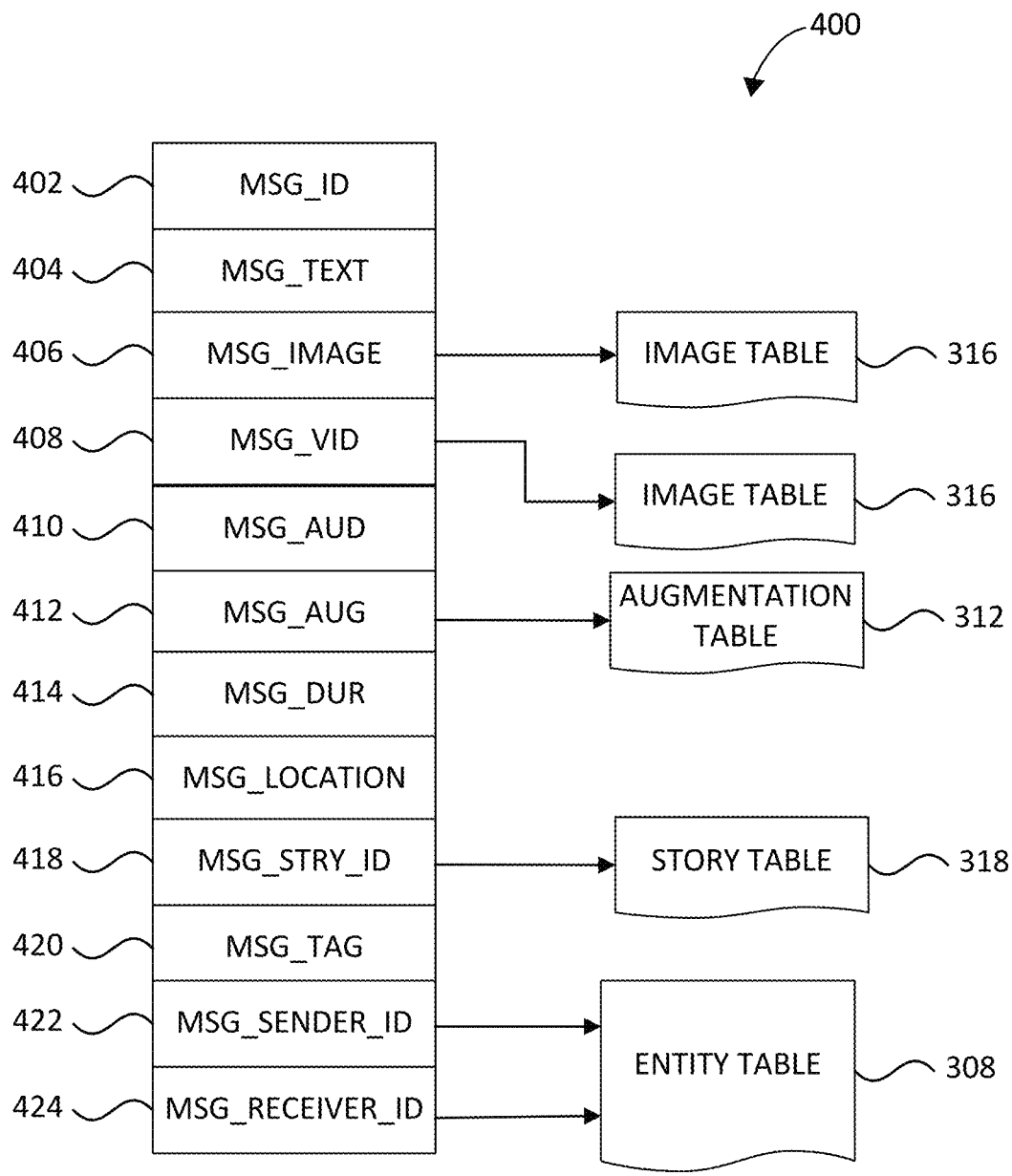
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Fashion Item Transfer System

Figure 5:
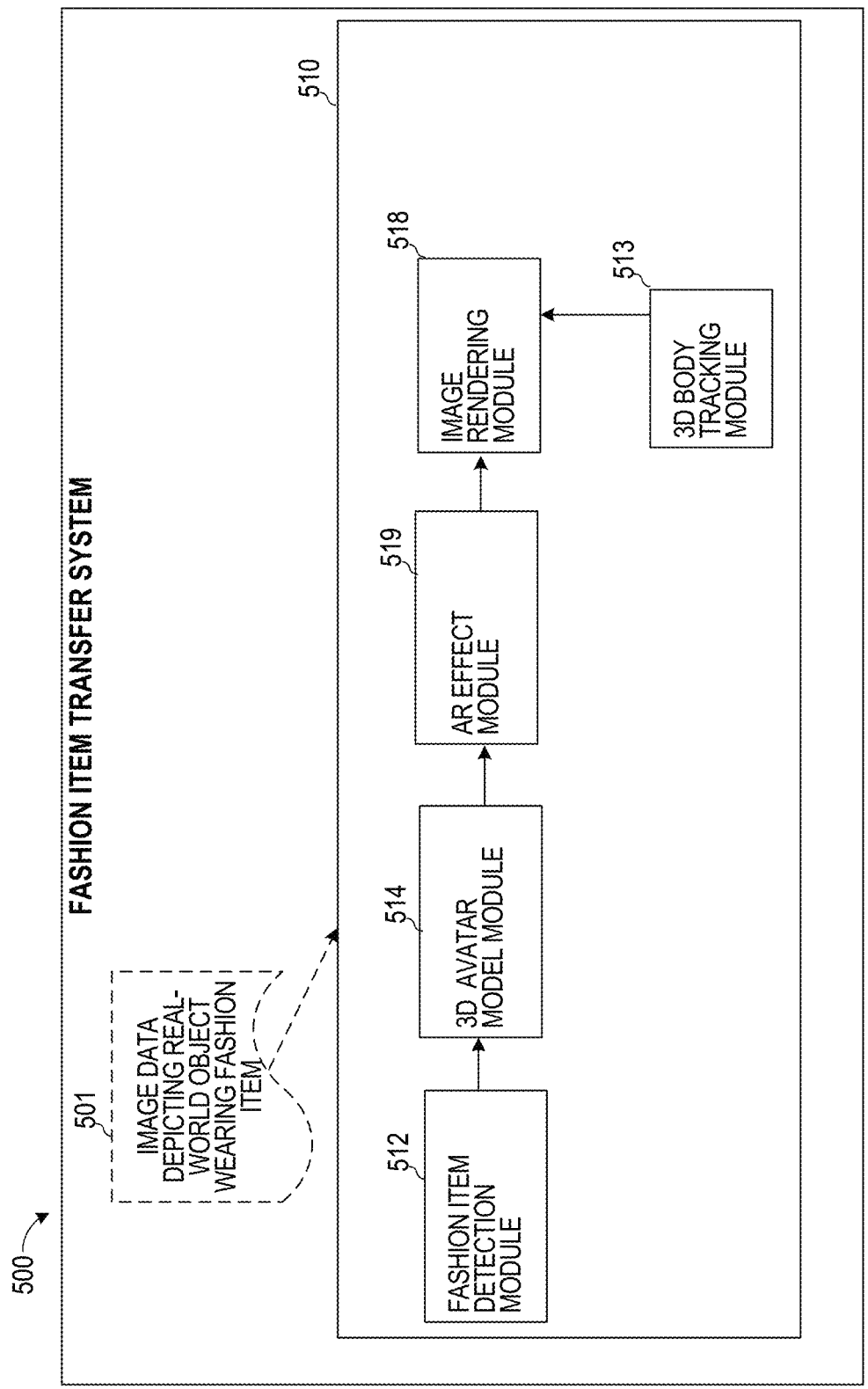
FIG. 5 is a block diagram showing an example fashion item transfer system, according to some examples.

FIG. 5 is a block diagram showing an example fashion item transfer system 500, according to some examples. Fashion item transfer system 500 includes a set of components 510 that operate on a set of input data (e.g., one or more monocular images or videos depicting a real-world object, such as a person or training data, wearing a fashion item (real-world fashion item or AR fashion item)). The set of input data can be obtained from one or more database(s) (FIG. 3) during the training phases and/or can be obtained from an RGB camera of a user system 102 when an AR/VR application is being used, such as by an interaction client 104. Fashion item transfer system 500 includes one or more machine learning models. The fashion item transfer system 500 includes a fashion item detection module 512, a 3D avatar model module 514, an AR effect module 519, an image rendering module 518, and a 3D body tracking module 513.

In some examples, the fashion item transfer system 500 receives an image data 501 that includes a depiction of a real-world object wearing a fashion item in a real-world environment and accesses a 3D avatar model of a human. The fashion item transfer system 500 generates an AR item corresponding to (e.g., resembling or having visual similarity to) the fashion item being worn by the real-world object depicted in the image 501. For example, fashion item transfer system 500 receives a 2D image that includes pixels of a fashion item (e.g., that exclusively includes pixels of the fashion item), such as based on a segmentation of the fashion item in a video. The fashion item transfer system 500 can access an online inventory of a store that is within a threshold distance of the user system 102 used to capture the image data 501. The fashion item transfer system 500 can match pixels of the 2D image of the fashion item with pixels of all of the items in the inventory and can identify an inventory item that matches the fashion item to retrieve a more detailed version of the fashion item that can include the AR item corresponding to the fashion item.

The fashion item transfer system 500 modifies the 3D avatar model of the human based on the AR item. The fashion item transfer system 500 presents the 3D avatar model that has been modified based on the AR item within a view of the real-world environment on the client device.

In some examples, the image 501 is received from one or more cameras embedded in the user system 102. The image 501 includes a frame of a video captured by the one or more cameras of the user system 102. In some examples, the modified 3D avatar model is added to the real-world environment depicted in the video. In some examples, the 3D avatar model is presented within one or more lenses of AR glasses.

In some examples, the real-world object includes a person in the real-world environment. In some examples, the real-world object includes a mannequin in the real-world environment. In some examples, the fashion item includes at least one of a shirt, pants, skirt, dress, jewelry, purse, eyewear, a purse, shorts, a jacket, a blouse, earrings, bunny ears, a hat, or earmuffs.

In some examples, the fashion item transfer system 500 receives a user request to transfer the fashion item depicted in the image 501 to the 3D avatar model. The 3D avatar model is modified based on the AR item in response to receiving the user request. In some examples, the user request includes verbal input, a selection of an on-screen option, or a gesture detected in a video stream captured by the client device.

In some examples, the fashion item transfer system 500 receives input that selects the 3D avatar model from a plurality of 3D avatar models. In some examples, the fashion item transfer system 500 segments the fashion item worn by the real-world object depicted in the image 501 and applies a 3D cloth simulation model to the segmented fashion item to generate the AR item. In some examples, the fashion item transfer system 500 animates the 3D avatar model that has been modified based on the AR item within the view of the real-world environment.

In some examples, the fashion item transfer system 500 loads the 3D avatar model in response to scanning a bar code that appears in the real-world environment. The fashion item transfer system 500 replaces one or more base garments worn by the 3D avatar model with the AR item.

In some examples, the fashion item transfer system 500 overlays the AR item on the one or more base garments worn by the 3D avatar model and hides (makes transparent) portions (e.g., pixels) of the one or more base garments that remain visible (are not occluded by the AR item) after being overlaid by the AR item.

In some examples, the fashion item transfer system 500 performs a body scan to generate the 3D avatar model. The fashion item transfer system 500 receives input that customizes a look of the generated 3D avatar model. In some examples, the fashion item transfer system 500 presents multiple copies of the 3D avatar model each being depicted as wearing a different fashion item. One of the copies of the 3D avatar model can be wearing the AR item.

In some examples, the fashion item transfer system 500 detects a pose of the 3D avatar model relative to a camera used to capture the image 501. The fashion item transfer system 500 generates a first set of body landmarks corresponding the 3D avatar model in the pose and a second set of body landmarks corresponding the real-world object wearing the fashion item. The fashion item transfer system 500 computes a deviation between the first set of body landmarks and the second set of body landmarks and modifies the first set of body landmarks associated with the 3D avatar model to match the second set of body landmarks associated with the real-world object based on the deviation or modifies the first set of body landmarks associated with the real-world object to match the second set of body landmarks associated with the 3D avatar model based on the deviation. The fashion item transfer system 500 applies a fitting model to the first and second sets of body landmarks to adjust one or more visual parameters of the AR item corresponding to the modified first set of body landmarks. The fashion item transfer system 500 generates an intermediate image by the fitting model depicting the AR item with the adjusted one or more visual parameters overlaid on the 3D avatar model and applies a generative machine learning model to the intermediate image to blend sets of pixels corresponding to one or more gaps or occlusions that appear in the intermediate image.

In some examples, the fashion item transfer system 500 trains the generative machine learning model by iterating through a sequence of training operations including receiving a first training image that depicts a training person in a first training pose and wearing a training fashion item. The training operations include receiving a training video that depicts the training person in a second training pose and applying the generative machine learning model to the first training image and a given frame of the training video to generate a depiction of the training person in the second training pose wearing the training fashion item. The training operations compute a deviation between the generated depiction of the training person in the second training pose wearing the training fashion item and the given frame of the training video and update one or more parameters of the generative machine learning model based on the computed deviation.

In some examples, the fashion item detection module 512 receives an image 501 from a camera of the user system 102 or other device. For example, the fashion item detection module 512 can access a real-time video feed being captured by the user system 102. The fashion item detection module 512 can detect input or a request from the user to perform a fashion item transfer operation. For example, the fashion item detection module 512 can detect hand gestures of a user of the user system 102 in the real-time video feed. The hand gesture can include a pinch gesture, a snapping gesture, a pointing gesture, or any other suitable gesture. In some cases, the hand gesture taps or corresponds to (e.g., hands can be placed to overlap) a displayed option corresponding to the fashion item transfer operations. The hand gesture can include positioning a real-world finger on top of a real-world object that wears the fashion item in the image 501 and double tapping or pinching the fashion item of the real-world object. In addition, or in the alternative, the fashion item detection module 512 can detect speech input received from the user that includes a spoken command to transfer a specific article of clothing (e.g., a shirt, pants, or the entire outfit including pants and shirt).

In response to receiving the user request or input, the fashion item detection module 512 processes the video and/or image 501 to detect the fashion item being worn by a real-world object depicted in the image 501 or video. For example, the fashion item detection module 512 can apply one or more machine learning models to the image 501 to extract and segment the fashion item from the image 501. This results in an output that includes only 2D pixels corresponding to the fashion item that is depicted in the image 501. The pixels corresponding to the fashion item are provided to the 3D avatar model module 514 and/or the AR effect module 519. As discussed below, the 3D avatar model module 514 in combination with the AR effect module 519 generate a 3D AR item corresponding to the fashion item for placement on a 3D avatar model and display of the 3D avatar model in the real-world environment depicted in the image 501 or video captured by the user system 102. In some cases, the 3D avatar model is placed next to the real-world object that is wearing the fashion item based on which the 3D avatar model is generated. In some cases, the 3D avatar model is placed in a new real-world environment, such as a real-world environment of a different user system 102 of another user.

The 3D avatar model module 514 receives input that generates a 3D avatar model. In some cases, the 3D avatar model module 514 receives the 3D avatar model from a second user or a second user system 102. In such cases, a first user of a first user system 102 can use the 3D avatar model received from a second user system 102 of a second user to visualize how different fashion items look on the 3D avatar model received from the second user of the second user system 102.

In some cases, the input can be received in response to the camera of the user system 102 capturing a barcode or other unique identifier, such as a quick reference (QR) code of the 3D avatar model. In response, the 3D avatar model module 514 retrieves the 3D avatar model corresponding to the barcode. In some cases, the 3D avatar model module 514 receives input from the user of the user system 102 that customizes the 3D avatar model. For example, the 3D avatar model module 514 can present a generic 3D avatar model on a display and can receive inputs from the user customizing the 3D avatar model. The customizations can include selection of a body type, weight, hair color, hair length, hair texture, and various other visual attributes, such as skin tones.

In some examples, the 3D avatar model module 514 communicates with a body scanning device. The body scanning device can allow a user to physically enter a scanning region. The body scanning device captures one or more images and/or uses infrared sensors to read and determine the body type of the user who is inside the scanning region. The body scanning device can then provide the information about the body type of the user to the 3D avatar model module 514. The 3D avatar model module 514 generates a generic 3D avatar model corresponding to the body type information it receives. In some cases, the 3D avatar model module 514 searches body type information associated with a list of previously generated 3D avatars. The 3D avatar model module 514 identifies a 3D avatar from the list of previously generated 3D avatars that has or is associated with body type information that matches the body type information received from the body scanning device better than all the other previously generated 3D avatars. This identified 3D avatar is used by the 3D avatar model module 514 to be modified based on the extracted fashion item provided by the fashion item detection module 512.

In some examples, the 3D avatar model module 514 receives a 3D cartoon representation of a user of the user system 102. The 3D avatar model module 514 can receive inputs from the user that customize the cartoon representation. The 3D avatar model module 514 can then convert the 3D cartoon representation of the user to a generic 3D avatar model. In this case, features of the generic 3D avatar model correspond to the features of the cartoon representation, including a body type, hair type and length, and skin tones.

The AR effect module 519 receives a 2D image that includes pixels of the fashion item extracted from the image 501 by the fashion item detection module 512. The AR effect module 519 generates a 3D AR item corresponding to the fashion item. In some examples, the AR effect module 519 applies one or more machine learning models to the 2D fashion item to generate the 3D AR item corresponding to the 2D fashion item.

Figure 6A:
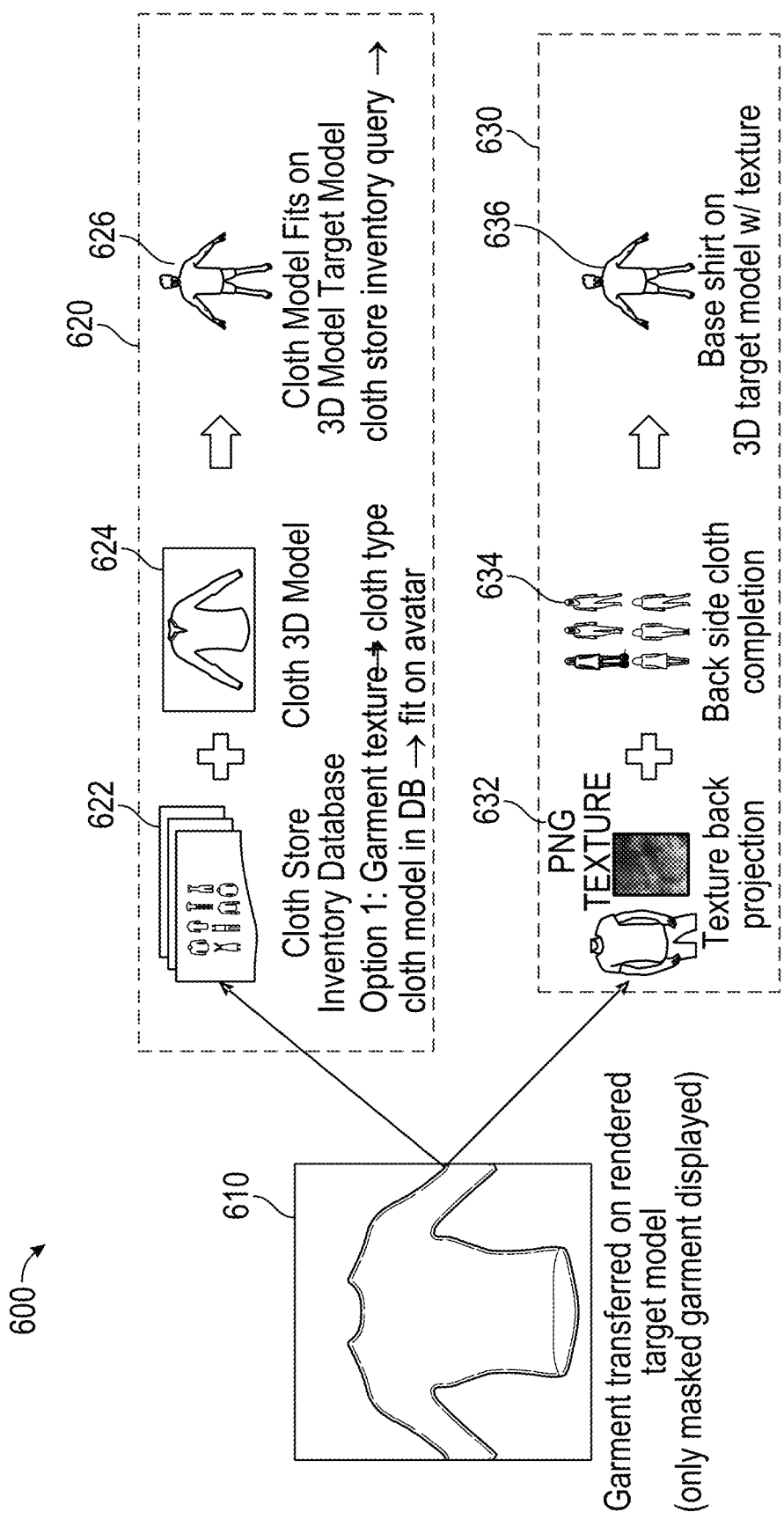
FIGS. 6A, 6B, and 7 are diagrammatic representations of inputs and outputs of the fashion item transfer system, in accordance with some examples.

For example, as shown in the diagram 600 of FIG. 6A, the AR effect module 519 receives a 2D image 610 that includes pixels of a fashion item (e.g., that exclusively includes pixels of the fashion item). The AR effect module 519 can, in some cases, perform a first set of operations 620 to fit an AR item corresponding to the fashion item on the 3D avatar model provided by the 3D avatar model module 514. The operations 620 can involve the AR effect module 519 accessing an online inventory 622 of a store that is within a threshold distance of the user system 102 used to capture the image 501. The AR effect module 519 can match pixels of the 2D image 610 with pixels of all of the items in the inventory 622. The AR effect module 519 can identify an inventory item that matches the fashion item to retrieve a more detailed version of the fashion item. The AR effect module 519 applies a 3D cloth simulation model 624 to the detailed version of the fashion item to generate the 3D AR item corresponding to the fashion item. For example, the 3D cloth simulation model 624 can implement one or more previously trained neural network models that identify what type of AR fashion item is being generated and obtain a particular cloth simulation that corresponds to the type of AR fashion item. Then, the 3D cloth simulation model 624 modifies a look of the fashion item to have wrinkles and light attributes that correspond or are based on the cloth simulation matching the type of AR fashion item. The AR effect module 519 can then retrieve the 3D avatar model and apply the 3D AR item directly to the 3D avatar model, such as by overlaying the 3D avatar model with the 3D AR item to generate the 3D avatar model 626 depicted as wearing the fashion item.

The AR effect module 519 can, in some cases, perform a second set of operations 630 to fit an AR item corresponding to the fashion item on the 3D avatar model provided by the 3D avatar model module 514. The operations 630 include performing a texture back projection operation 632 on the 2D image 610. This results in an image that more completely represents the fashion item. The AR effect module 519 can also apply one or more machine learning models to perform operation 634 to complete non-visible portions of the fashion item depicted in the 2D image 610, such as back portions of the fashion item where only the front portions are visible. In some cases, the AR effect module 519 can duplicate pixels on edges of the fashion item across the entire back portion of the fashion item to complete the look of the fashion item. The AR effect module 519 can use the complete fashion item to generate a 3D AR item corresponding to the fashion item. The AR effect module 519 can then retrieve the 3D avatar model and apply the 3D AR item directly to the 3D avatar model, such as by overlaying the 3D avatar model with the 3D AR item to generate the 3D avatar model 636 depicted as wearing the fashion item.

In some examples, the operations 620 can be combined with the operations 630 to improve the look of the 3D avatar model 626/636 depicted as wearing the fashion item.

Figure 6B:
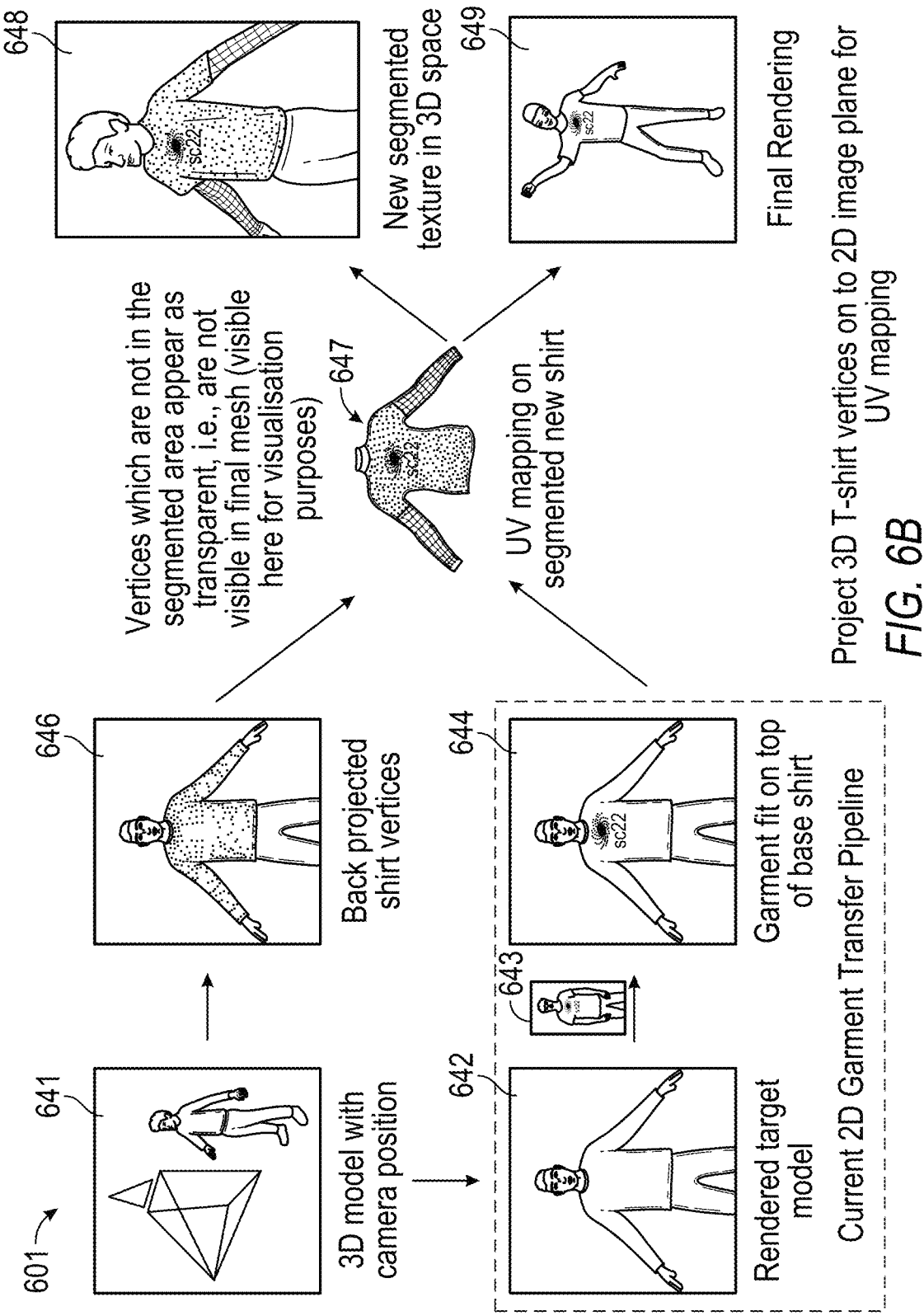

In some examples, in addition to or alternative to performing operations 620 and 630 (or as part of performing the operation 632 and 634), the AR effect module 519 can perform operations 601 shown in FIG. 6B. Particularly, the operations 601 involve applying one or more machine learning models to a 3D avatar that is in a first pose to map pixels of a fashion item that is worn by a real-world object that is in a different, second pose on the 3D avatar model. In some cases, the AR effect module 519 accesses the 3D avatar model from the 3D avatar model module 514. The AR effect module 519 determines a camera angle used to capture the image 501 and places the camera virtually relative to the 3D avatar model, as shown in operation 641. The AR effect module 519 captures a 2D image 642 of the 3D avatar model from the result of operation 641.

This 2D image 642 of the 3D avatar model represents the 3D avatar model in a first pose. The 2D image 642 is provided along with an image 643 (e.g., the image 501) that depicts the real-world object in a second pose wearing the fashion item to the one or more machine learning models. The one or more machine learning models are trained to map the fashion item worn in the second pose by the real-world object to the 2D image 642 of the 3D avatar that is in the first pose. The one or more machine learning models generate an intermediate image 644 that depicts a 2D representation of the 3D avatar in the first pose wearing the fashion item of the real-world object depicted in the image 643 in the second pose.

During training, the machine learning models receive a set of training images or videos. The set of images or videos include a depiction of a person in a first pose wearing a fashion item and a depiction of the person in a second pose wearing the same fashion item. The machine learning models extract one or more features from a given set of training images or videos that depict the person wearing the fashion item in the first pose to render an estimated image or video that depicts the person wearing the fashion item in the second pose. The machine learning models can then compare the estimated image or video to the ground truth image that depicts the person in the second pose wearing the fashion item to compute a deviation and to update parameters of the machine learning models.

As an example, a first training image or video is applied to the machine learning models to extract one or more body landmarks from the first training image or video. A second training image or video is also applied to the machine learning models to extract one or more body landmarks from the second training image or video. A fit between the two sets of body landmarks is computed to generate an adjustment to the training fashion item depicted in the training image or video based on difference in poses of the person depicted in the first and second training images. The machine learning models generate an intermediate image that depicts the given person wearing the training fashion item in the second pose. The machine learning models generate or estimate a new image or video based on the intermediate image in which the given person depicted in the first training image or video is depicted as wearing the particular training fashion item as the given person depicted in the second training image or video. Namely, the second machine learning model is trained to generate an image or video that retains the motion of a person in a first image but that has an appearance in which a training fashion item is replaced to copy a fashion item worn by another person in a second image or video. The image rendering module 518 can adjust colors (pixel values, skin tones, reflections, lighting patterns and conditions, occlusions, gaps, luminance, intensity, and so forth) of the intermediate image.

The machine learning models compare the generated or estimated new image or video with the second training image or video to compute a deviation. Based on how close the rendered image or video is to the second training image or video, the machine learning models make a determination to complete training. In an example, the machine learning models update one or more parameters of the machine learning models based on the computed deviation. The machine learning models determine if the computed deviation is within a threshold error or if a certain number of iterations or epochs have been performed to determine if a stopping criterion is met. In response to determining that the stopping criterion has been met, the machine learning models complete training and the parameters and coefficients of the machine learning models are stored in the trained machine learning technique(s) 307. In response to determining that the stopping criterion has not been met, the machine learning models obtain a second pair of training images or videos that depict the same person wearing the same fashion item and performing different motions or poses. The machine learning models iterate through the above training process to render a new image in which fashion items worn by the person in one of the training images or videos is modified to mirror or copy the fashion items worn by the person in a second of the training images or videos. Parameters of the machine learning models are again updated and a deviation is computed to determine whether a stopping criterion is met.

In this way, the machine learning models are trained to establish a relationship between the body landmarks of a person in a first image or video, the body landmarks of a person in a second image or video, and a rendered image or video of the person in the first image or video wearing a different fashion item corresponding to the fashion item worn by the second person in the second image or video.

Referring back to FIG. 6B, the AR effect module 519 can determine vertices 646 of the current garment or fashion item worn by the 3D avatar model. These vertices 646 are combined with the intermediate image 644 to generate a UV mapping 647 of the 2D image of the 3D avatar with the 3D vertices 646 of the 3D avatar. The UV mapping 647 is used to render the display of an image 648 that depicts the avatar in the first pose wearing the fashion item of the real-world object in the second pose. In some cases, the 3D avatar model is wearing a default, current, or specific garment. The UV mapping 647 can identify which portions of the 3D avatar model are overlaid by the AR item corresponding to the fashion item worn by the real-world object and which are not. In the process of generating the image 648, the AR effect module 519 can reduce visibility by making transparent or partially transparent any portions of the current garment worn by the 3D avatar model that are not overlaid by the AR item. The image 648 can be used to animate the avatar for display in a real-time video 649 in a real-world environment.

Specifically, referring back to FIG. 5, the animated avatar wearing the AR item corresponding to the fashion item is provided to the image rendering module 518. The image rendering module 518 together with 3D body tracking module 513 renders a presentation of the 3D avatar wearing the AR item in a real-world environment depicted in the image 501 and/or a real-time video feed. The 3D avatar wearing the AR item can be presented together with the real-word object that is wearing the fashion item.

Figure 7:
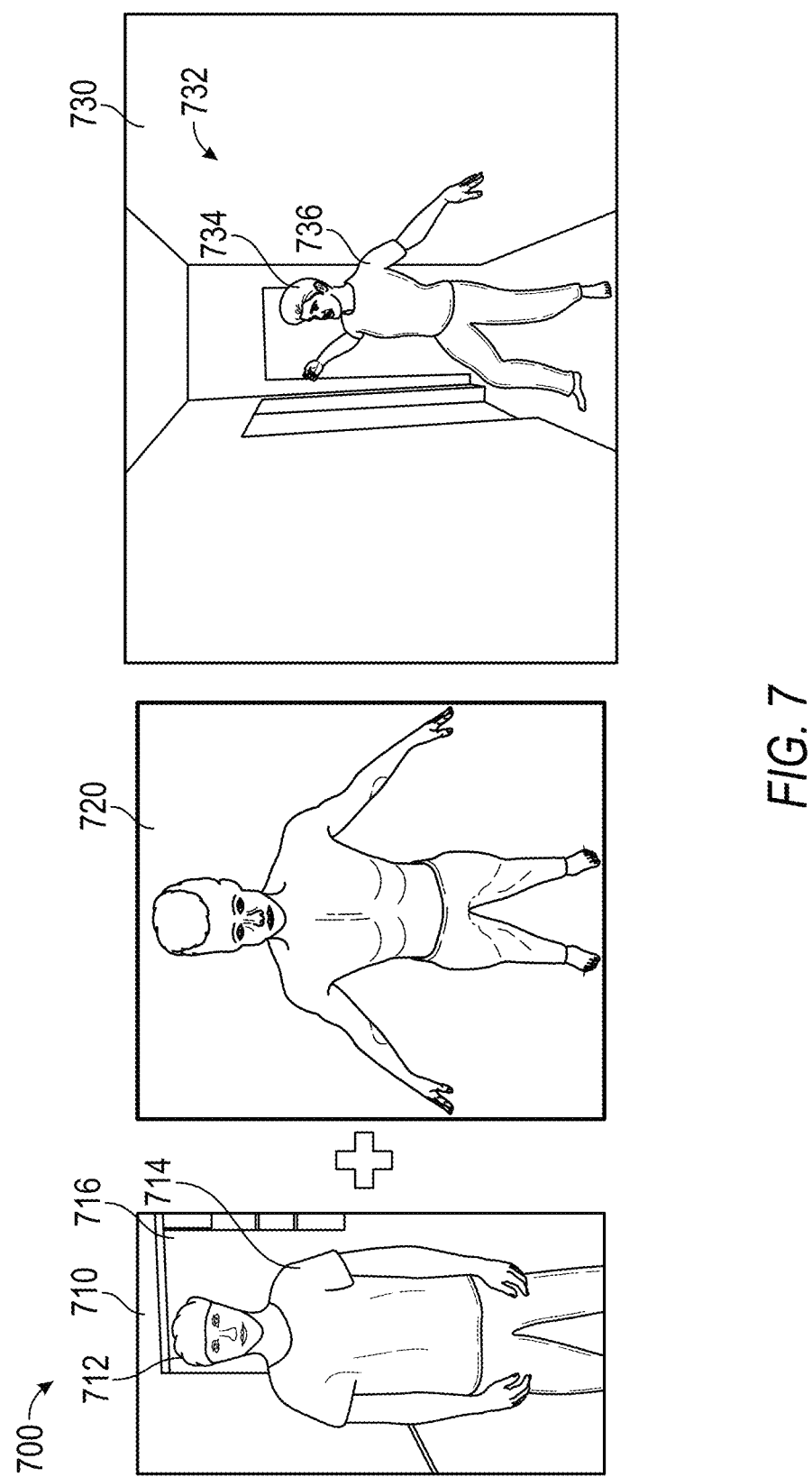

For example, as shown in the diagram 700 of FIG. 7, the user system 102 can capture a real-time video feed 710. The real-time video feed 710 can include a depiction of a real-world object 712 in a real-world environment 716. The real-world object 712 can be wearing a fashion item 714. The fashion item transfer system 500 can receive input that selects a 3D model 720. The fashion item transfer system 500 can apply the processes discussed above to generate an AR item correspond to the fashion item 714. The fashion item 714 is applied to the 3D model 720. The 3D model 720 with the AR item can then be displayed in an image 730 or video. For example, the image 730 depicts the avatar 734 wearing the AR item 736 corresponding to the fashion item 714 in a real-world environment 732. The real-world environment 732 can be the same as the real-world environment 716 or can be entirely different.

In some examples, multiple 3D avatar models can be generated by the image rendering module 518 in real time. Each of the 3D avatar models can be identical in look but can be rendered to wear a different garment. For example, a user can select multiple fashion items that are depicted as being worn by real-world objects in one or more images. Each of the multiple fashion items can be extracted and stored by the fashion item transfer system 500. The fashion item transfer system 500 can then present multiple 3D avatar models where each is wearing a different one of the extracted fashion items. Input can be received from a user requesting to physically try on the fashion items being worn by the 3D avatar models. In response, a communication is sent to a physical store associated with the fashion items instructing the physical store to place the corresponding physical merchandise in a fitting room for a user to try on physically.

Figure 8:
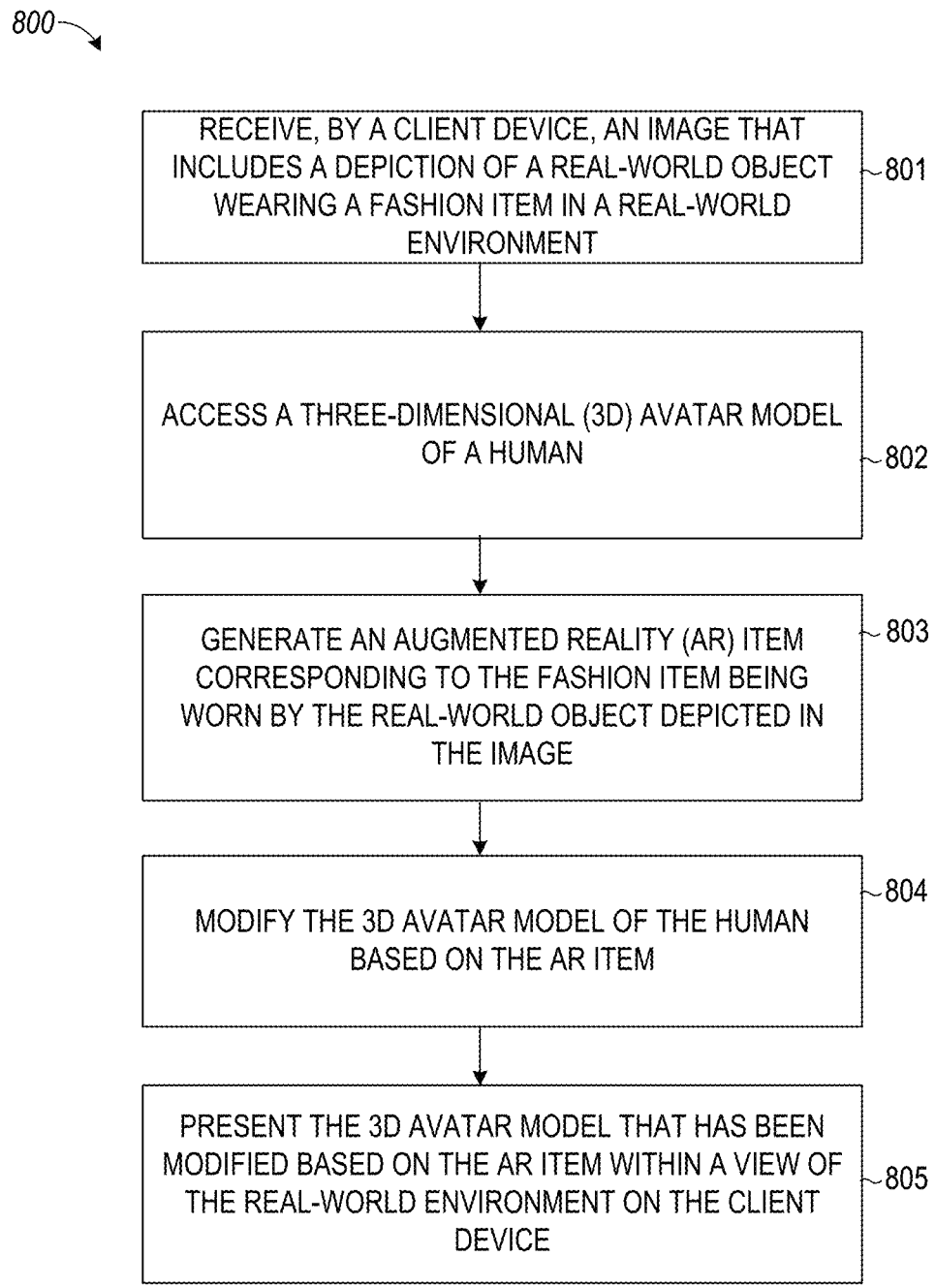
FIG. 8 is a flowchart illustrating example operations of the fashion item transfer system, according to some examples.

FIG. 8 is a flowchart of a process 800 performed by the fashion item transfer system 500, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, the fashion item transfer system 500 (e.g., a user system 102 or a server) receives, by a client device, an image that includes a depiction of a real-world object wearing a fashion item in a real-world environment, as discussed above.

At operation 802, the fashion item transfer system 500 accesses a 3D avatar model of a human, as discussed above.

At operation 803, the fashion item transfer system 500 generates an AR item corresponding to the fashion item being worn by the real-world object depicted in the image, as discussed above.

At operation 804, the fashion item transfer system 500 modifies the 3D avatar model of the human based on the AR item, as discussed above.

At operation 805, the fashion item transfer system 500 presents the 3D avatar model that has been modified based on the AR item within a view of the real-world environment on the client device, as discussed above.

Machine Architecture

Figure 9:
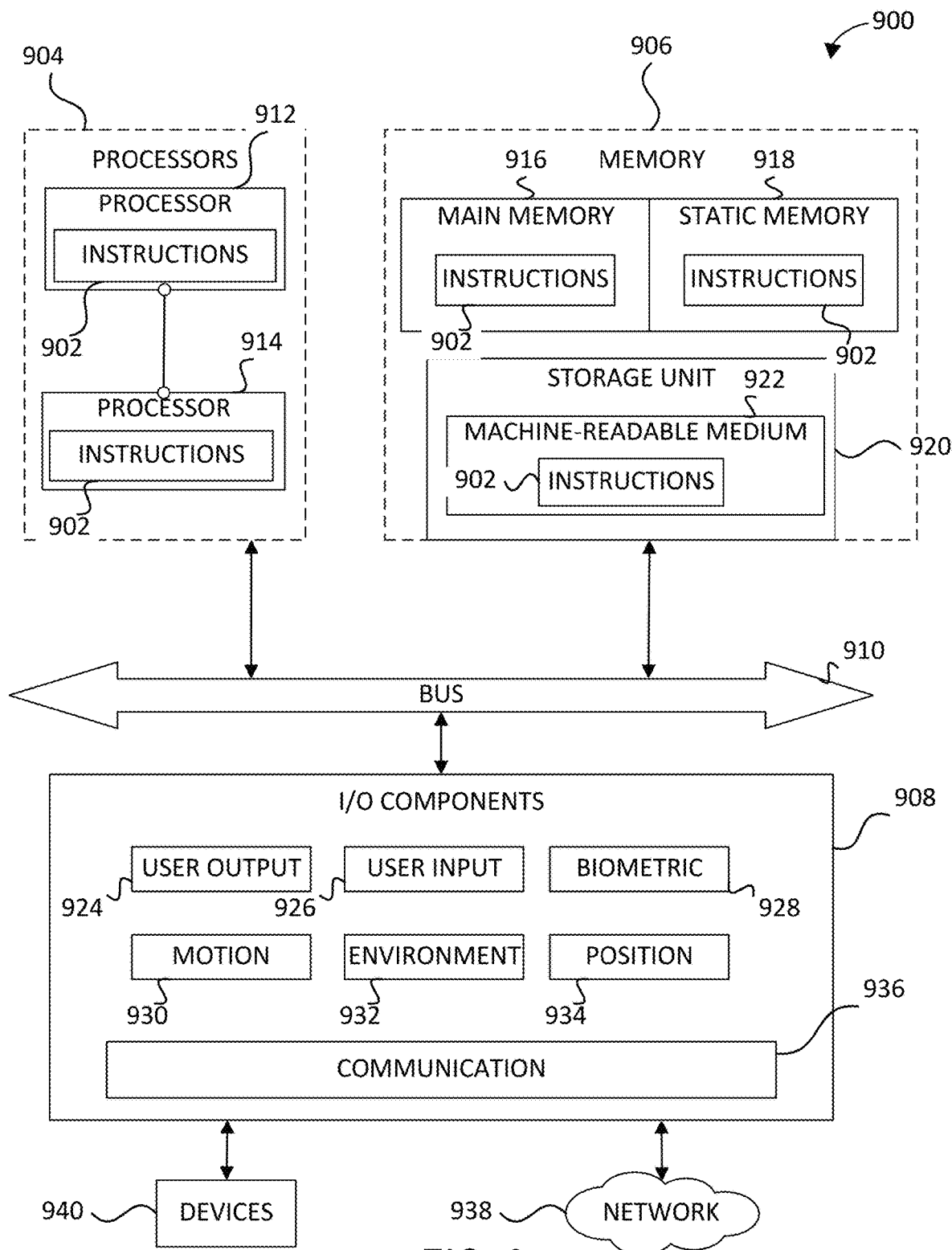
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described.

The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° Camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
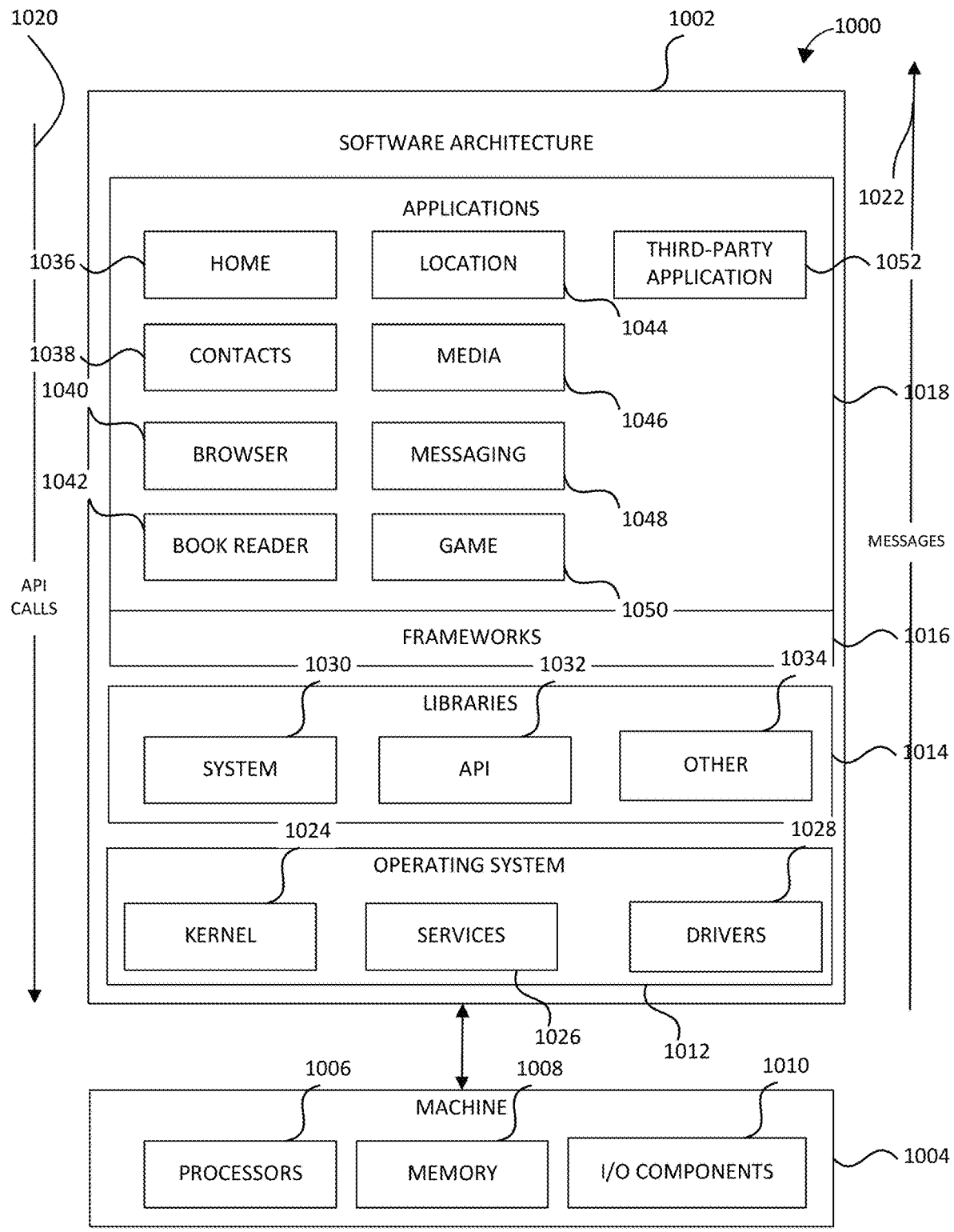
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

System with Head-Wearable Apparatus

Figure 11:
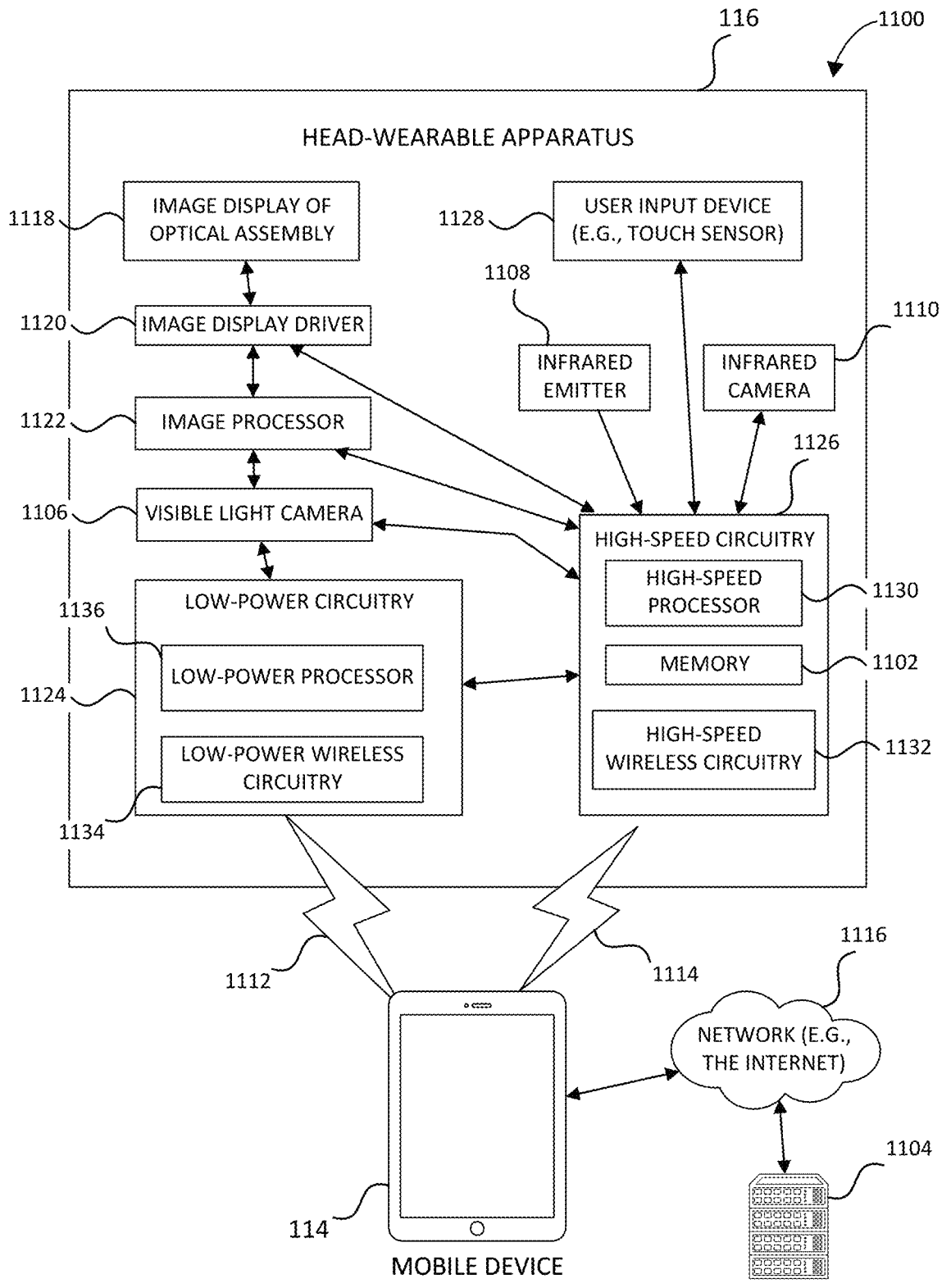
FIG. 11 illustrates a system in which a head-wearable apparatus may be implemented, according to some examples.

FIG. 11 illustrates a system 1100 including a head-wearable apparatus 116 with a selector input device, according to some examples. FIG. 11 is a high-level functional block diagram of an example head-wearable apparatus 116 communicatively coupled to a mobile device 114 and various server systems 1104 (e.g., the interaction server system 110) via various networks 108.

The head-wearable apparatus 116 includes one or more cameras, each of which may be, for example, a visible light camera 1106, an infrared emitter 1108, and an infrared camera 1110.

The mobile device 114 connects with head-wearable apparatus 116 using both a low-power wireless connection 1112 and a high-speed wireless connection 1114. The mobile device 114 is also connected to the server system 1104 and the network 1116.

The head-wearable apparatus 116 further includes two image displays of the image display of optical assembly 1118. The two image displays of optical assembly 1118 include one associated with the left lateral side and one associated with the right lateral side of the head-wearable apparatus 116. The head-wearable apparatus 116 also includes an image display driver 1120, an image processor 1122, low-power circuitry 1124, and high-speed circuitry 1126. The image display of optical assembly 1118 is for presenting images and videos, including an image that can include a graphical user interface, to a user of the head-wearable apparatus 116.

The image display driver 1120 commands and controls the image display of optical assembly 1118. The image display driver 1120 may deliver image data directly to the image display of optical assembly 1118 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1128 (e.g., touch sensor or push button), including an input surface on the head-wearable apparatus 116. The user input device 1128 (e.g., touch sensor or push button) is to receive from the user an input selection to manipulate the graphical user interface of the presented image.

The components shown in FIG. 11 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1106 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1102, which stores instructions to perform a subset or all of the functions described herein. The memory 1102 can also include a storage device.

As shown in FIG. 11, the high-speed circuitry 1126 includes a high-speed processor 1130, a memory 1102, and high-speed wireless circuitry 1132. In some examples, the image display driver 1120 is coupled to the high-speed circuitry 1126 and operated by the high-speed processor 1130 in order to drive the left and right image displays of the image display of optical assembly 1118. The high-speed processor 1130 may be any processor capable of managing high-speed communications and operation of any general computing system needed for the head-wearable apparatus 116. The high-speed processor 1130 includes processing resources needed for managing high-speed data transfers on a high-speed wireless connection 1114 to a wireless local area network (WLAN) using the high-speed wireless circuitry 1132. In certain examples, the high-speed processor 1130 executes an operating system such as a LINUX operating system or other such operating system of the head-wearable apparatus 116, and the operating system is stored in the memory 1102 for execution. In addition to any other responsibilities, the high-speed processor 1130 executing a software architecture for the head-wearable apparatus 116 is used to manage data transfers with high-speed wireless circuitry 1132. In certain examples, the high-speed wireless circuitry 1132 is configured to implement Institute of Electrical and Electronic Engineers (IEEE) 802.11 communication standards, also referred to herein as WiFi. In some examples, other high-speed communications standards may be implemented by the high-speed wireless circuitry 1132.

The low-power wireless circuitry 1134 and the high-speed wireless circuitry 1132 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 1112 and the high-speed wireless connection 1114, may be implemented using details of the architecture of the head-wearable apparatus 116, as can other elements of the network 1116.

The memory 1102 includes any storage device capable of storing various data and applications, including, among other things, camera data generated by the left and right visible light cameras 1106, the infrared camera 1110, and the image processor 1122, as well as images generated for display by the image display driver 1120 on the image displays of the image display of optical assembly 1118. While the memory 1102 is shown as integrated with high-speed circuitry 1126, in some examples, the memory 1102 may be an independent standalone element of the head-wearable apparatus 116. In certain such examples, electrical routing lines may provide a connection through a chip that includes the high-speed processor 1130 from the image processor 1122 or the low-power processor 1136 to the memory 1102. In some examples, the high-speed processor 1130 may manage addressing of the memory 1102 such that the low-power processor 1136 will boot the high-speed processor 1130 any time that a read or write operation involving memory 1102 is needed.

As shown in FIG. 11, the low-power processor 1136 or high-speed processor 1130 of the head-wearable apparatus 116 can be coupled to the camera (visible light camera 1106, infrared emitter 1108, or infrared camera 1110), the image display driver 1120, the user input device 1128 (e.g., touch sensor or push button), and the memory 1102.

The head-wearable apparatus 116 is connected to a host computer. For example, the head-wearable apparatus 116 is paired with the mobile device 114 via the high-speed wireless connection 1114 or connected to the server system 1104 via the network 1116. The server system 1104 may be one or more computing devices as part of a service or network computing system, for example, that includes a processor, a memory, and network communication interface to communicate over the network 1116 with the mobile device 114 and the head-wearable apparatus 116.

The mobile device 114 includes a processor and a network communication interface coupled to the processor. The network communication interface allows for communication over the network 1116, low-power wireless connection 1112, or high-speed wireless connection 1114. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1120. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1104, such as the user input device 1128, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1112 and high-speed wireless connection 1114 from the mobile device 114 via the low-power wireless circuitry 1134 or high-speed wireless circuitry 1132.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    receiving, by one or more processors of a device, an image that includes a depiction of a real-world object having a fashion item in a real-world environment;
    accessing a three-dimensional (3D) avatar model of a human;
    generating a graphic item resembling the fashion item being worn by the real-world object depicted in the image;
    modifying the 3D avatar model of the human based on the graphic item to generate a modified 3D avatar model, the modifying of the 3D avatar model comprising:
        overlaying the graphic item on the 3D avatar model;
        identifying an individual portion of the 3D avatar model that is not overlaid by the graphic item; and
        reducing visibility of the individual portion of the 3D avatar model that is not overlaid by the graphic item; and
    presenting the modified 3D avatar model within a view of the real-world environment on the device.

2. The method of claim 1, wherein the graphic item comprises an augmented reality item, wherein the image is received from one or more cameras embedded in the device, and wherein the image comprises a frame of a video captured by the one or more cameras.

3. The method of claim 2, wherein the modified 3D avatar model is added to the real-world environment depicted in the video, wherein reducing the visibility of the individual portion comprises making the individual portion at least partially transparent.

4. The method of claim 3, wherein the modified 3D avatar model is presented within one or more lenses of AR glasses.

5. The method of claim 1, wherein the real-world object comprises a person in the real-world environment.

6. The method of claim 1, wherein the real-world object comprises a mannequin in the real-world environment.

7. The method of claim 1, wherein the fashion item comprises an outfit, further comprising:
    accessing an online inventory of a store that is within a threshold distance of the device that was used to capture the image that includes the depiction of the real-world object having the fashion item;
    matching pixels of fashion item in the image with pixels of items in the inventory of the store;
    identifying an individual item in the inventory of the store that matches the fashion item in the image; and
    retrieving, as the graphic item, a detailed version of the fashion item using the identified individual item in the inventory of the store.

8. The method of claim 1, further comprising:
    receiving a user request to transfer the fashion item depicted in the image to the 3D avatar model, wherein the 3D avatar model is modified based on the graphic item to generate the modified 3D avatar in response to receiving the user request.

9. The method of claim 8, wherein the user request comprises verbal input, a selection of an on-screen option, or a gesture detected in a video stream captured by the device.

10. The method of claim 1, further comprising:
    receiving input that selects the 3D avatar model from a plurality of 3D avatar models.

11. The method of claim 1, further comprising:
    segmenting the fashion item worn by the real-world object depicted in the image; and
    applying a 3D cloth simulation model to the segmented fashion item to generate the graphic item.

12. The method of claim 1, further comprising:
    animating the 3D avatar model that has been modified based on the graphic item within the view of the real-world environment.

13. The method of claim 1, further comprising:
    loading the 3D avatar model in response to scanning a bar code that appears in the real-world environment; and
    replacing one or more base garments worn by the 3D avatar model with the graphic item.

14. The method of claim 13, further comprising:
    overlaying the graphic item on the one or more base garments worn by the 3D avatar model; and
    hiding portions of the one or more base garments that remain visible after being overlaid by the graphic item.

15. The method of claim 1, further comprising:
    performing a body scan to generate the 3D avatar model; and
    receiving input that customizes a look of the generated 3D avatar model.

16. The method of claim 1, further comprising:
    presenting multiple copies of the 3D avatar model each being depicted as wearing a different fashion item, one of the copies of the 3D avatar model wearing the graphic item.

17. The method of claim 1, further comprising:
    determining a pose of the 3D avatar model;
    obtaining a first set of body landmarks corresponding the 3D avatar model in the pose and a second set of body landmarks corresponding the real-world object wearing the fashion item;
    computing a deviation between the first set of body landmarks and the second set of body landmarks;
    modifying the first set of body landmarks associated with the real-world object to match the second set of body landmarks associated with the 3D avatar model based on the deviation;
    applying a fitting model to the first and second sets of body landmarks to adjust one or more visual parameters of the graphic item corresponding to the modified first set of body landmarks;
    generating an intermediate image by the fitting model depicting the graphic item with the adjusted one or more visual parameters overlaid on the 3D avatar model; and
    applying a generative machine learning model to the intermediate image to blend sets of pixels corresponding to one or more gaps or occlusions that appear in the intermediate image.

18. The method of claim 17, further comprising training the generative machine learning model by iterating through a sequence of training operations comprising:

receiving a first training image that depicts a training person in a first training pose and wearing a training fashion item;

receiving a training video that depicts the training person in a second training pose;

applying the generative machine learning model to the first training image and a given frame of the training video to generate a depiction of the training person in the second training pose wearing the training fashion item;

computing a deviation between the generated depiction of the training person in the second training pose wearing the training fashion item and the given frame of the training video; and updating one or more parameters of the generative machine learning model based on the computed deviation.

19. A system comprising:

at least one processor of a device; and a memory component having instructions stored thereon that, when executed by the at least one processor, cause the at least one processor to perform operations comprising:

receiving an image that includes a depiction of a real-world object having a fashion item in a real-world environment;

accessing a three-dimensional (3D) avatar model of a human;

generating a graphic item resembling the fashion item being worn by the real-world object depicted in the image;

modifying the 3D avatar model of the human based on the graphic item to generate a modified 3D avatar model, the modifying of the 3D avatar model comprising:

overlaying the graphic item on the 3D avatar model;

identifying an individual portion of the 3D avatar model that is not overlaid by the graphic item; and reducing visibility of the individual portion of the 3D avatar model that is not overlaid by the graphic item; and presenting the modified 3D avatar model within a view of the real-world environment on the device.

20. A non-transitory computer-readable storage medium having stored thereon instructions that, when executed by at least one processor, cause the at least one processor to perform operations comprising:

receiving, by a device, an image that includes a depiction of a real-world object having a fashion item in a real-world environment;

accessing a three-dimensional (3D) avatar model of a human;

generating a graphic item resembling the fashion item being worn by the real-world object depicted in the image;

modifying the 3D avatar model of the human based on the graphic item to generate a modified 3D avatar model, the modifying of the 3D avatar model comprising:

overlaying the graphic item on the 3D avatar model;

identifying an individual portion of the 3D avatar model that is not overlaid by the graphic item; and reducing visibility of the individual portion of the 3D avatar model that is not overlaid by the graphic item; and presenting the modified 3D avatar model within a view of the real-world environment on the device.

* * * * *